(12) United States Patent
Fujioka

(10) Patent No.: US 11,396,209 B2
(45) Date of Patent: Jul. 26, 2022

(54) PNEUMATIC TIRE

(71) Applicant: TOYO TIRE CORPORATION, Itami (JP)

(72) Inventor: Tsuyoshi Fujioka, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 431 days.

(21) Appl. No.: 16/437,506

(22) Filed: Jun. 11, 2019

(65) Prior Publication Data

US 2019/0389254 A1 Dec. 26, 2019

(30) Foreign Application Priority Data

Jun. 26, 2018 (JP) .............................. JP2018-121081

(51) Int. Cl.
*B60C 11/13* (2006.01)
*B60C 11/04* (2006.01)
*B60C 11/12* (2006.01)
*B60C 11/03* (2006.01)

(52) U.S. Cl.
CPC ........ *B60C 11/047* (2013.01); *B60C 11/0306* (2013.01); *B60C 11/12* (2013.01); *B60C 11/1353* (2013.01)

(58) Field of Classification Search
CPC ... B60C 11/1353; B60C 11/047; B60C 11/13; B60C 11/042; B60C 11/04; B60C 2011/1361; B60C 11/00; B60C 11/03; B60C 11/11; B60C 11/12; B60C 2011/0381

See application file for complete search history.

(56) References Cited

U.S. PATENT DOCUMENTS

| 5,160,385 A | 11/1992 | Goto et al. | |
|---|---|---|---|
| 2007/0012389 A1* | 1/2007 | Ito | B60C 11/047 152/209.22 |
| 2008/0149242 A1* | 6/2008 | Oyama | B60C 11/13 152/209.19 |
| 2018/0001710 A1 | 1/2018 | Fujioka | |
| 2020/0148008 A1* | 5/2020 | Nemoto | B60C 13/001 |

FOREIGN PATENT DOCUMENTS

| CN | 107554198 A | 1/2018 |
|---|---|---|
| JP | 3-67706 A | 3/1991 |
| JP | H03-067706 A | 3/1991 |

(Continued)

OTHER PUBLICATIONS

JP 2012101745 Machine Translation; Sato, Kenichi (Year: 2012).*

(Continued)

*Primary Examiner* — Robert C Dye
*Assistant Examiner* — Nicholas J Weiler
(74) *Attorney, Agent, or Firm* — WHDA, LLP

(57) ABSTRACT

A pneumatic tire includes a plurality of main grooves each extending in a tire circumferential direction, and a shoulder rib formed by a shoulder main groove included in the main grooves. The shoulder rib is formed in an outer part of the pneumatic tire in a tire width direction. The shoulder rib includes a closed slit that communicates with the shoulder main groove and ends in the shoulder rib. The shoulder main groove includes a protrusion that extends into the closed slit.

2 Claims, 4 Drawing Sheets

(56) References Cited

FOREIGN PATENT DOCUMENTS

| | | | |
|---|---|---|---|
| JP | 2006-111216 A | | 4/2006 |
| JP | 2010052698 A | * | 3/2010 |
| JP | 2012-101745 A | | 5/2012 |
| JP | 2012101745 A | * | 5/2012 ........... B60C 11/047 |

OTHER PUBLICATIONS

JP 2010052698 Machine Translation; Matsunaga, Midori (Year: 2010).*
Office Action dated Mar. 3, 2021, issued in counterpart CN Application No. 201910501856.X, with English translation. (10 pages).
Office Action dated Jul. 30, 2021, issued in counterpart CN application No. 201910501856.X, with English translation. (12 pages).
Office Action dated Feb. 14, 2022, issued in counterpart CN application No. 201910501856.X, with the English machine translation. (10 pages).
Office Action dated Feb. 22, 2022, issued in counterpart JP application No. 2018-121081, with the English machine translation. (6 pages).

* cited by examiner

F I G. 4
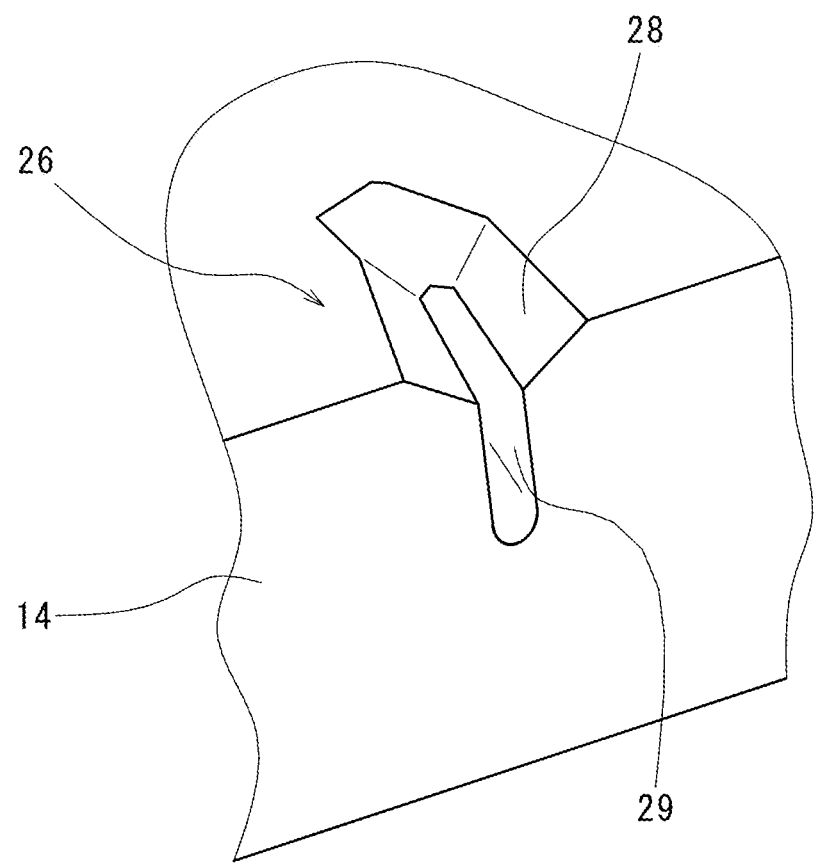

PNEUMATIC TIRE

CROSS-REFERENCE TO RELATED APPLICATIONS

This application claims priority of Japanese Patent Application No. 2018-121081 filed on Jun. 26, 2018, the content of which is incorporated herein by reference.

BACKGROUND OF THE INVENTION

Technical Field

The present invention relates to a pneumatic tire.

Related Art

A pneumatic tire conventionally known includes stone catch preventing ridges at intersections of circumferential grooves and lateral grooves (e.g., see JP H03-67706 A).

The pneumatic tire described above includes closed slits formed in a shoulder rib and extended from a shoulder main groove side to improve traction performance. Accordingly, the shoulder main groove and the closed slits form recesses expanded more than other portions. This configuration therefore causes a problem of easy catch of stones by these recesses.

An object of the present invention is to provide a pneumatic tire capable of effectively preventing stone catch even when closed slits are formed in a shoulder rib.

SUMMARY

As means for achieving the above object, the present invention provides a pneumatic tire including: a plurality of main grooves each extending in a tire circumferential direction; and a shoulder rib formed by a shoulder main groove included in the main grooves, the shoulder rib being formed in an outer part of the pneumatic tire in a tire width direction. The shoulder rib includes a closed slit that communicates with the shoulder main groove and ends in the shoulder rib. The shoulder main groove includes a protrusion that extends into the closed slit.

According to this configuration, the protrusion extending from the shoulder main groove into the closed slit elastically deforms at the time of ground contact. Accordingly, a stone caught in the closed slit can be securely discharged.

It is preferable that a tip of the protrusion is located in the closed slit and has an acute angle.

According to this configuration, a force can be intensively applied to a stone caught into the closed slit by the tip of the elastically deformed protrusion at the time of ground contact. Accordingly, the caught stone can be more easily discharged.

It is preferable that the protrusion has a tip located in the closed slit and branched into two parts.

According to this configuration, forces at the two tips can be applied to a stone caught into the closed slit at the time of ground contact. Accordingly, the caught stone can be more easily discharged.

It is preferable that the protrusion includes a plurality of acute-angled tips.

According to this configuration, a stone caught in a peripheral region can be effectively discharged as well as a stone in the closed slit.

It is preferable that the shoulder main groove includes a ridge that divides a bottom of the pneumatic tire in a longitudinal direction, and that a tip of the protrusion protrudes toward at least one of parts divided by the ridge.

It is preferable that the protrusion has a star shape that has five acute-angled tips.

According to the present invention, the protrusion extending from the shoulder main groove into the closed slit formed in the shoulder rib is formed. Accordingly, the caught stone can be effectively discharged by deformation of the protrusion at the time of ground contact.

BRIEF DESCRIPTION OF THE DRAWINGS

The foregoing and the other features of the present invention will become apparent from the following description and drawings of an illustrative embodiment of the invention in which:

FIG. 4 is a partial perspective enlargement view showing a second closed slit in FIG. 2.

DETAILED DESCRIPTION OF EMBODIMENTS

An embodiment according to the present invention will be hereinafter described with reference to the accompanying drawings. It should be noted that the following description is essentially presented by way of example, and not intended to limit the present invention, applicable ranges of the present invention, or purposes of use of the present invention.

Figure 1:
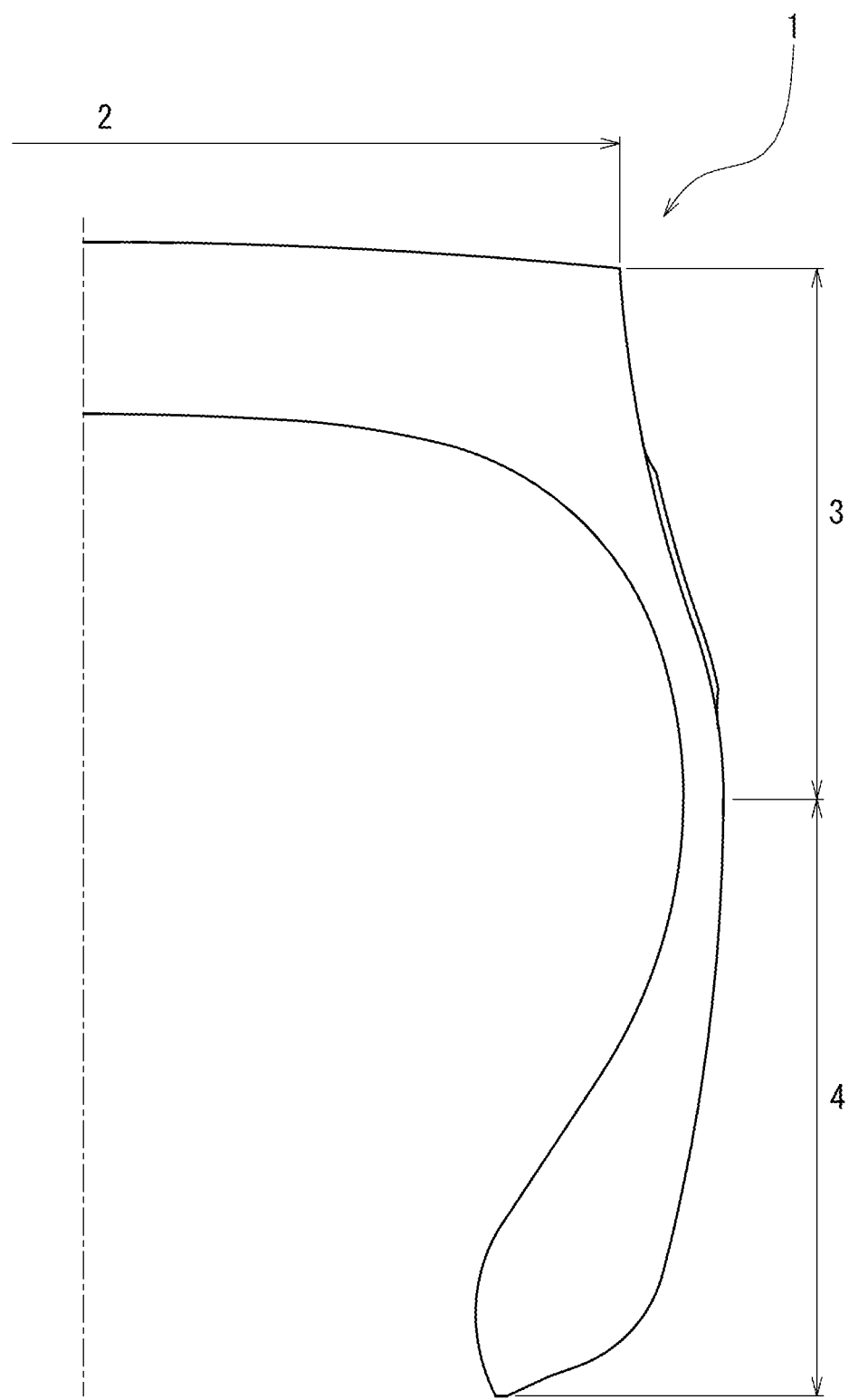
FIG. 1 is a schematic view showing a half meridian cross section of a pneumatic tire according to the present embodiment.

FIG. 1 is a schematic view of a half meridian cross section of a pneumatic tire 1 (hereinafter referred to as a tire 1) according to the present embodiment. The tire 1 includes a tread portion 2 in contact with a road surface, a side portion 3 continuing from the tread portion 2 toward the inside in a tire radial direction, and a bead portion 4 continuing from the side portion 3 toward the inside in the tire radial direction and attached to a not-shown rim.

Figure 2:
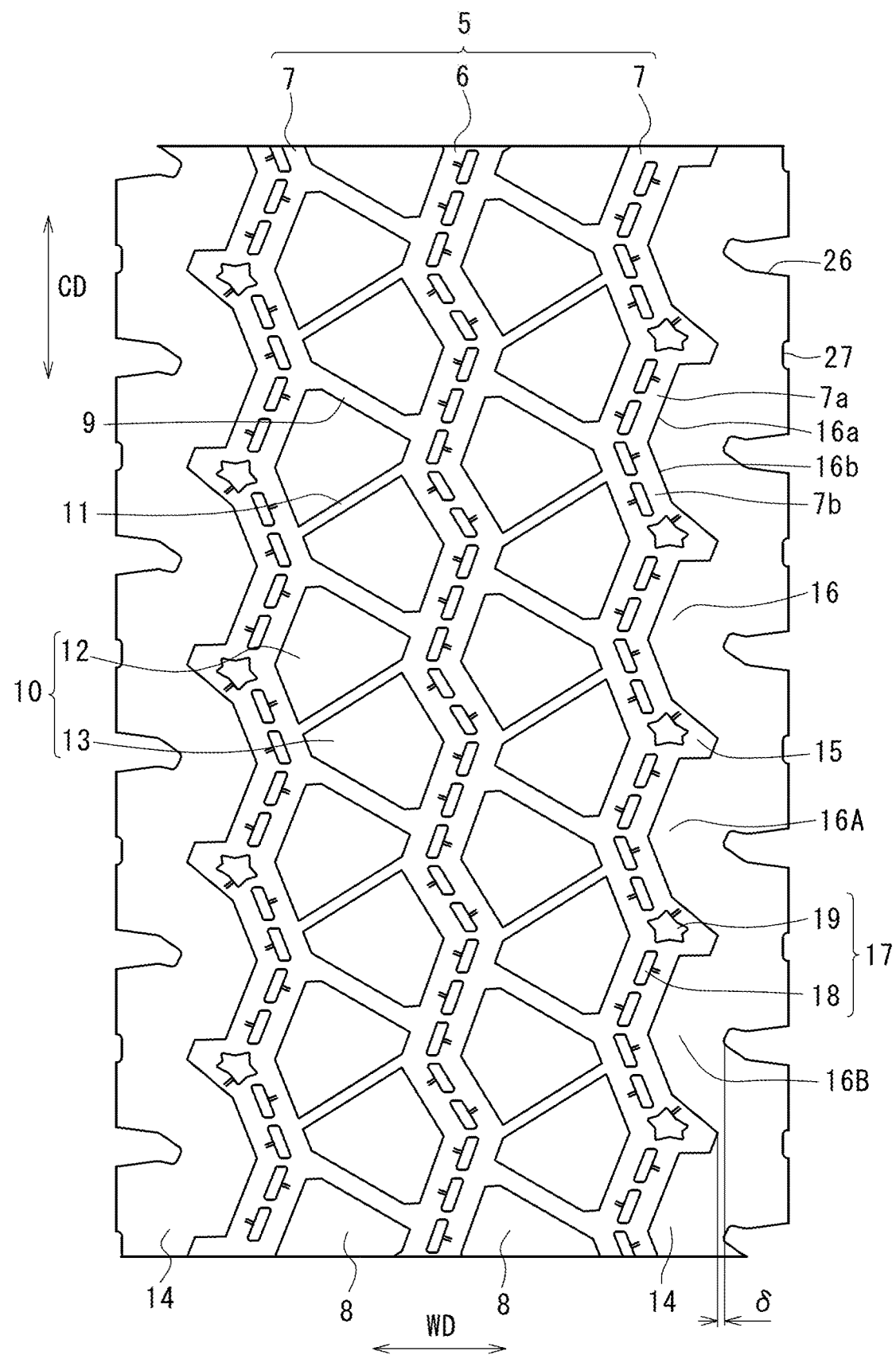
FIG. 2 is a partial development view of a tread portion shown in FIG. 1.

FIG. 2 is a partial development view of the tread portion 2 shown in FIG. 1. The tread portion 2 includes a plurality of (three in this case) main grooves 5 each extending in a tire circumferential direction CD. One central groove of the main grooves 5 is a center main groove 6, and two side grooves of the main grooves 5 are shoulder main grooves 7. Each of the main grooves 5 is formed in a zigzag shape.

Center ribs 8 are formed by the center main groove 6 and the shoulder main grooves 7. Each of the center ribs 8 includes wide slits 9 obliquely extending in a tire width direction WD and formed at predetermined intervals in the tire circumferential direction CD. Each of the wide slits 9 has width and depth smaller than width and depth of each of the main grooves 5. The respective wide slits 9 divides each of the center ribs 8 into a block row constituted of a plurality of blocks 10. Each of the blocks 10 is further divided by a narrow slit 11 into a first small block 12 and a second small block 13 each having a hexagonal shape. Each of the narrow slits 11 has width and depth smaller than width and depth of each of the wide slits 9. The positional relationship between the first small block 12 and the second small block 13 in one of the two center ribs 8 is set opposite to the corresponding relationship of the other center rib 8 in the tire circumferential direction CD.

Shoulder ribs 14 are formed on both sides sectioned by the shoulder main grooves 7 in the tire width direction WD. Each of the shoulder main grooves 7 is constituted of first shoulder main grooves 7a extending diagonally downward to the left, and second shoulder main grooves 7b extending diagonally downward to the right in FIG. 2. Each of the shoulder ribs 14 includes first closed slits 15 each extending from a position projecting outward in the tire width direction WD from a region of intersection of the first shoulder main groove 7a and the second shoulder main groove 7b. The respective first closed slits 15 are provided with a predetermined pitch in the tire circumferential direction CD. Each position of the first closed slits 15 in the tire circumferential direction CD is located in correspondence with a corner most projecting toward the shoulder main groove 7 in the corners of the corresponding block 10.

Figure 3:
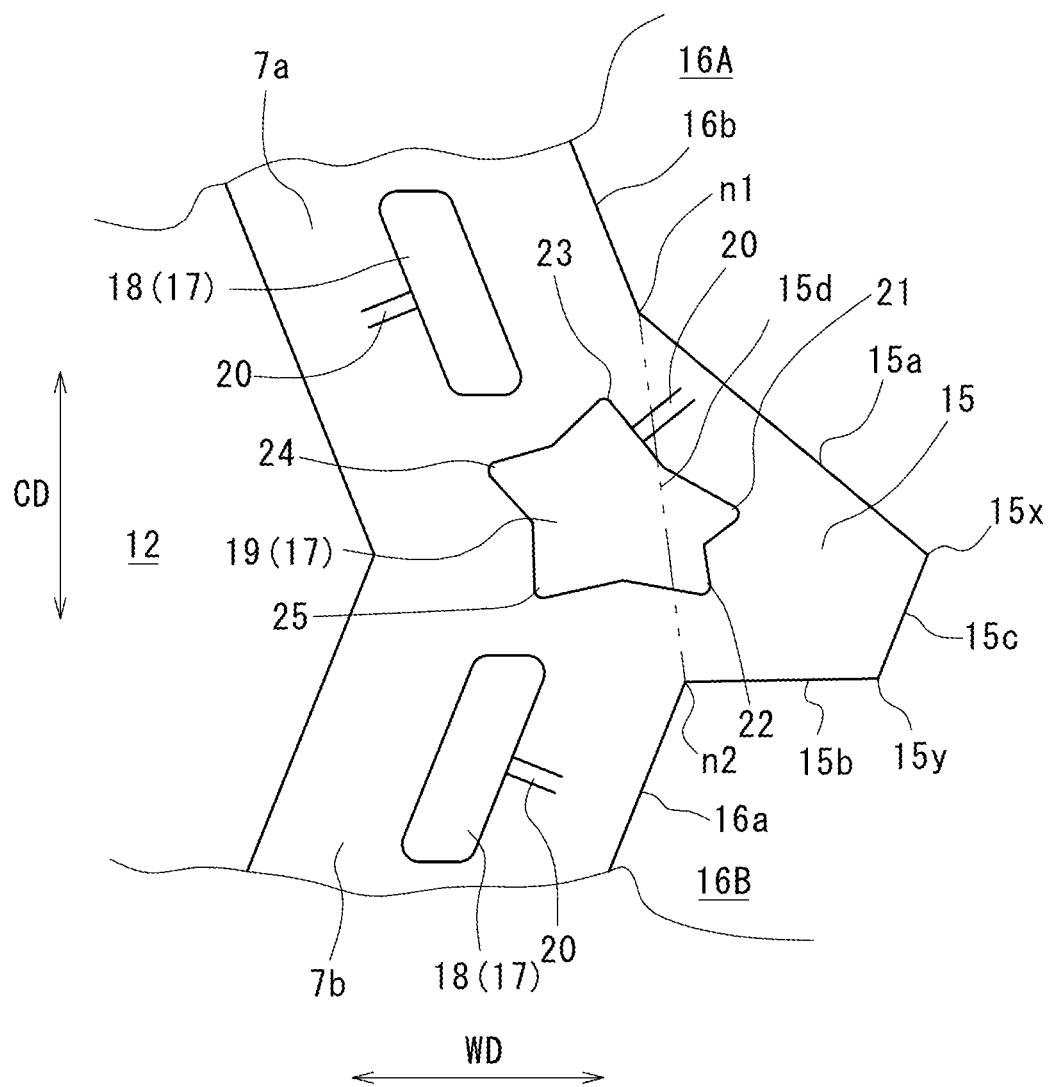
FIG. 3 is a partial enlargement view showing a first closed slit in FIG. 2.

The shoulder rib 14 located on the right side in FIG. 2 will be described with reference to FIG. 3. The shoulder rib 14 positioned on the left side has the same configuration as the configuration of the shoulder rib 14 on the right side except for the positional relationship that the shoulder rib 14 on the left side is rotated through 180° around any of central positions in the tire width direction WD. Accordingly, the same explanation of this configuration is not repeated.

Protrusions 16 protruding toward the shoulder main groove 7 are provided between the respective first closed slits 15. An edge defining each of the protrusions 16 includes a first inclined edge 16a and a second inclined edge 16b. The first inclined edge 16a extends obliquely downward to the left (herein inclined by about 22° with respect to a straight line extending in the tire circumferential direction CD). The second inclined edge 16b extends obliquely downward to the right (herein inclined by about 15° with respect to the straight line extending in the tire circumferential direction CD).

The first closed slits 15 are formed between first protrusions 16A and second protrusions 16B disposed in the tire circumferential direction CD. Each of the first closed slits 15 is a region surrounded by three edges 15a, 15b, and 15c and an imaginary line 15d. The first edge 15a is inclined such that an inclination angle becomes larger than an inclination angle of the second inclined edge 16b of the first protrusion 16A. The second edge 15b is so inclined as to extend in the tire width direction WD from the first inclined edge 16a of the second protrusion 16B. The third edge 15c connects the first edge 15a and the second edge 15b, and is parallel to the first inclined edge 16a of the second protrusion 16B. The imaginary line 15d is a straight line connecting an intersection point n1 of the second inclined edge 16b and the first edge 15a, and an intersection point n2 of the second edge 15b and the first inclined edge 16a (indicated by a two-dot chain line in FIG. 3).

A plurality of protrusions 17 are formed at a groove bottom of the shoulder main groove 7. Each of the protrusions 17 is constituted of first protrusions 18 formed on a center line of the shoulder main groove 7 and a second protrusion 19 extending from the shoulder main groove 7 toward the first closed slit 15.

Each of the first protrusions 18 has a substantially parallelogram in a plan view, and is formed on the center line of the shoulder main groove 7. The two first protrusions 18 are disposed on each of the first shoulder main groove 7a and the second shoulder main groove 7b of the shoulder main groove 7. Corners of each of the first protrusions 18 are chamfered in an arc shape. A rib 20 extends from a central portion of the first protrusion 18 toward an inner surface of a side wall constituting the shoulder main groove 7. While not shown in the figure, the inner surface of the side wall forming the shoulder main groove 7 is constituted of a tapered surface inclined toward the center line with nearness to the groove bottom. The respective ribs 20 formed on each of the first shoulder main groove 7a and the second shoulder main groove 7b extend toward the tapered surfaces opposite to each other.

The second protrusion 19 is star-shaped in a plan view, and extends from the shoulder main groove 7 into the first closed slit 15. The second protrusion 19 has triangular tips each protruding at an acute angle and located at five positions on a circumference of the second protrusion 19. The part which protrudes into the first closed slit 15 is constituted of a first tip 21 and a second tip 22 as branched two parts. The first tip 21 extends toward a first corner 15x at intersection of the first edge 15a and the third edge 15c of the first closed slit 15. The second tip 22 extends toward a second corner 15y at intersection of the second edge 15b and the third edge 15c. The third tip 23 extends toward a space between the shoulder rib 14 and the first protrusion 18 formed in the first shoulder main groove 7a. The fourth tip 24 extends toward a space between the first protrusion 18 and the center rib 8. The fifth tip 25 extends toward the first protrusion 18 formed in the second shoulder main groove 7b.

As shown in FIG. 2, the shoulder rib 14 includes second closed slits 26 and lug grooves 27 formed at an outer edge of the shoulder rib 14 in the tire width direction WD. The second closed slits 26 and the lug grooves 27 are alternately disposed in the tire circumferential direction CD.

As shown in FIG. 4, the second closed slit 26 has a first slit portion 28 including a tapered surface which has a width gradually decreasing from the surface of the shoulder rib 14, and a second slit portion 29 constituted of a narrow groove continuing from the first slit portion 28. Accordingly, the second closed slit 26 has a Y-shaped whole shape.

As shown in FIG. 2, each of the second closed slits 26 extends from the outer edge of the shoulder rib 14 toward the inside in the tire width direction WD. The tip of the second closed slit 26 ends near the center of the shoulder rib 14. A tapered surface extending in the tire width direction WD is similarly formed at an end position of the second closed slit 26.

As described above, the first slit portion 28 has a tapered surface and expands toward the outer surface, while the second slit portion 29 has a reduced width. Accordingly, prevention of stone catch is easily achievable. Moreover, the second slit portion 29 extends deep, and therefore maintains traction performance even after the shoulder rib 14 is worn away.

In addition, the second closed slit 26 is formed at a position corresponding to a central portion of the adjoining first closed slits 15 in the tire circumferential direction CD. Accordingly, the position of the second closed slit 26 is shifted from the first closed slits 15 in the tire circumferential direction CD. Furthermore, each of the first closed slits 15 and each of the second closed slits 26 are disposed so as not to overlap in the tire width direction WD as viewed in the tire circumferential direction CD. More specifically, the end position of the second closed slit 26 is shifted in the tire width direction WD from the end position of the first closed slit 15 (this shift amount is indicated by δ in FIG. 2). This configuration maintains desired rigidity of the shoulder rib 14, thereby preventing deterioration of cornering performance.

According to the pneumatic tire 1 configured as described above, each of the center ribs 8 has a block row constituted of the plurality of blocks 10. Each of the main grooves 5 has a zigzag shape. Each of the shoulder ribs 14 also has the first closed slits 15 and the second closed slits 26. Accordingly, traction improves.

Each of the main grooves 5 also includes the first protrusions 18, and the second protrusions 19 each extending into the first closed slit 15 which extends from the shoulder main groove 7 to the shoulder rib 14. This configuration discharges a stone caught in any of the main grooves 5 or the first closed slits 15. More specifically, the first protrusions 18 and the second protrusions 19 deform at the time of ground contact, and apply a force for discharging the caught stone. Particularly, the second protrusion 19 has the first tip 21 and the second tip 22 each protruding at an acute angle into the first closed slit 15. Accordingly, the force can be intensively applied to the caught stone at the portions protruding at the acute angle. Moreover, each of the first tip 21 and the second tip 22 faces the farthest corner of the first closed slit 15. In this case, the force applied to the caught stone can easily discharge the stone. Accordingly, a discharging operation is effectively achievable.

Furthermore, the first closed slits 15 and the second closed slits 26 formed in the shoulder rib 14 are shifted from each other in the tire circumferential direction CD. In addition, the end positions of the first closed slits 15 and the second closed slits 26 are separated from each other in the tire width direction WD. This configuration can prevent deterioration of rigidity while improving traction of the shoulder rib 14. Accordingly, cornering does not deteriorate. Particularly, each of the second closed slits 26 has a Y-shaped cross section. In this case, a stone is not easily caught, and traction is maintained by second openings even after the shoulder rib 14 is worn away.

It should be noted that the present invention is not limited to the configuration described in the embodiment herein, but includes various other modifications.

While the two center ribs 8 and the two shoulder ribs 14 are provided in the embodiment described above, various other modes may be adopted. For example, two mediating ribs may be provided on both sides of the one center rib 8, and the shoulder rib 14 may be provided on the outside of each of the mediating ribs in the tire width direction WD.

What is claimed is:

1. A pneumatic tire comprising:
a plurality of main grooves each extending in a tire circumferential direction; and
a shoulder rib formed by a shoulder main groove included in the main grooves, the shoulder rib being formed in an outer part of the pneumatic tire in a tire width direction,
wherein
the shoulder rib includes a closed slit that communicates with the shoulder main groove and ends in the shoulder rib,
the shoulder main groove includes a protrusion that extends into the closed slit and has tips each having a triangular shape and formed at an acute angle in a development view, and
the protrusion has a star shape that has five acute-angled tips.

2. The pneumatic tire according to claim 1, wherein
the shoulder main groove includes a ridge that divides a bottom of the pneumatic tire shoulder main groove in a longitudinal direction, and
a tip of the protrusion protrudes toward at least one of parts divided by the ridge.

* * * * *